United States Patent
Yoon et al.

(10) Patent No.: US 11,319,463 B2
(45) Date of Patent: May 3, 2022

(54) MULTILAYER ADHESIVE FILM

(71) Applicant: Koza Novel Materials Korea Co., Ltd., Seoul (KR)

(72) Inventors: Hu Young Yoon, Daejeon (KR); Jae Sung Hong, Daejeon (KR); Sle Lee, Daejeon (KR); Jun Man Choi, Daejeon (KR); Woo Yeon Kim, Daejeon (KR); Ho Kyung Song, Daejeon (KR)

(73) Assignee: Koza Novel Materials Korea Co., Ltd.

( * ) Notice: Subject to any disclaimer, the term of this patent is extended or adjusted under 35 U.S.C. 154(b) by 0 days.

(21) Appl. No.: 17/041,679

(22) PCT Filed: Oct. 11, 2019

(86) PCT No.: PCT/KR2019/013315
§ 371 (c)(1),
(2) Date: Sep. 25, 2020

(87) PCT Pub. No.: WO2020/080743
PCT Pub. Date: Apr. 23, 2020

(65) Prior Publication Data
US 2021/0130656 A1  May 6, 2021

(30) Foreign Application Priority Data
Oct. 16, 2018 (KR) .................. 10-2018-0123301

(51) Int. Cl.
| C09J 7/38 | (2018.01) |
| C09J 7/10 | (2018.01) |
| C09J 11/06 | (2006.01) |
| C09J 133/08 | (2006.01) |
| C09J 133/10 | (2006.01) |

(52) U.S. Cl.
CPC .............. *C09J 7/385* (2018.01); *C09J 7/10* (2018.01); *C09J 11/06* (2013.01); *C09J 133/08* (2013.01); *C09J 133/10* (2013.01); *B32B 2405/00* (2013.01); *B32B 2457/20* (2013.01); *B32B 2457/202* (2013.01); *C09J 2203/318* (2013.01); *C09J 2301/208* (2020.08); *C09J 2301/312* (2020.08); *C09J 2433/00* (2013.01); *C09K 2323/05* (2020.08); *C09K 2323/057* (2020.08)

(58) Field of Classification Search
CPC ............ B32B 2405/00; B32B 2457/20; B32B 2457/202; C09J 7/00; C09J 7/10; C09J 7/385; C09J 11/06; C09J 133/06; C09J 133/08; C09J 133/10; C09J 2203/318; C09J 2301/208; C09J 2301/312; C09J 2301/414; C09J 2433/00; C09K 2323/05; C09K 2323/057
See application file for complete search history.

(56) References Cited

U.S. PATENT DOCUMENTS

| 2012/0064338 | A1 | 3/2012 | Niimi et al. |
| 2013/0177758 | A1 | 7/2013 | Shigetomi et al. |
| 2015/0140249 | A1 | 5/2015 | Yoon et al. |
| 2017/0166786 | A1 | 6/2017 | Moon et al. |
| 2019/0284446 | A1* | 9/2019 | Prenzel .................. C09J 7/385 |
| 2020/0095484 | A1 | 3/2020 | Lee et al. |
| 2020/0325362 | A1* | 10/2020 | Burmeister ............... C09J 7/22 |

FOREIGN PATENT DOCUMENTS

| CN | 103097483 A | 5/2013 | |
| JP | 2009013361 A | 1/2009 | |
| JP | 2014132078 A | 7/2014 | |
| JP | 2014205735 A | 10/2014 | |
| JP | 2017066243 A | 4/2017 | |
| JP | 2017075281 A | 4/2017 | |
| JP | 2017171749 A | 9/2017 | |
| KR | 20130131795 A | 12/2013 | |
| KR | 20160025050 A | 3/2016 | |
| KR | 20170018150 A | 2/2017 | |
| KR | 20170045117 A | 4/2017 | |
| KR | 20170070370 A | 6/2017 | |
| KR | 20170099696 A | 9/2017 | |
| KR | 20170128743 A | 11/2017 | |
| KR | 20180127736 A | 11/2018 | |
| WO | WO-2017207119 A1 * | 12/2017 | ............... C08J 7/18 |
| WO | WO-2018086804 A1 * | 5/2018 | ............... C09J 7/20 |

OTHER PUBLICATIONS

Search report from International Application No. PCT/KR2019/013315, dated Jan. 20, 2020.

* cited by examiner

*Primary Examiner* — Eli D. Strah
(74) *Attorney, Agent, or Firm* — Lerner, David, Littenberg, Krumholz & Mentlik, LLP

(57) ABSTRACT

A multilayer adhesive film is provided including: a first outer adhesive layer; a second outer adhesive layer; and an intermediate adhesive layer disposed between the first outer adhesive layer and the second outer adhesive layer. The multilayer adhesive film has both high step absorbency and excellent reworkability.

16 Claims, No Drawings

MULTILAYER ADHESIVE FILM

CROSS REFERENCE TO RELATED APPLICATIONS

The present application is a national stage entry under 35 U.S.C. § 371 of International Application No. PCT/KR2019/013315 filed on Oct. 11, 2019, which claims priority to Korean Patent Application No. 10-2018-0123301 filed with the Korean Intellectual Property Office on Oct. 16, 2018, the entire contents of which are incorporated herein by reference.

TECHNICAL FIELD

The present invention relates to a multilayer adhesive film, and more particularly, to a multilayer adhesive film having excellent ink step absorbency and reworkability.

BACKGROUND

Various parts of an electronic device are attached by an adhesive film. For example, a liquid crystal display (LCD) includes various optical parts, such as a polarizing plate, a phase retardation plate, an optical compensation film, a reflection sheet, a protective film and a brightness enhancement film, which may be attached by an adhesive film.

Meanwhile, an adhesive film which is used in an optical part such as a touch panel may be applied to a substrate or the like, which has a ink step. In this case, when the adhesive film does not have a step absorbency enough to absorb the ink step, problems will arise in that the adhesive film does not exhibit sufficient adhesiveness, and furthermore, delayed bubbles occur near the step, causing deterioration in the durability of the product. In addition, when a failure occurs in a process of attaching optical parts to each other by the adhesive film, if residue remains on the optical parts after the adhesive film is removed to reuse the optical parts, a problem will arise in that it is impossible to reuse the optical parts.

Hence, there is a need for an adhesive film having high step absorbency and excellent reworkability.

PRIOR ART DOCUMENTS

Patent Documents

Korean Patent Application Laid-Open Publication No. KR 10-2013-0131795A

SUMMARY

A problem to be solved by the present invention is to provide a multilayer adhesive film having high step absorbency and excellent reworkability.

However, problems to be solved by the present invention are not limited to the above-mentioned problem, and other problems which are not mentioned herein will be clearly understood by those skilled in the art from the following description.

One embodiment of the present invention provides a multilayer adhesive film including: a first outer adhesive layer; a second outer adhesive layer; and an intermediate adhesive layer disposed between the first outer adhesive layer and the second outer adhesive layer, the multilayer adhesive film having a tensile strength of 40,000 gf/mm² or more and 50,000 gf/mm² or less, wherein the first outer adhesive layer and the second outer adhesive layer are each a cured product of an outer adhesive composition containing a first resin and an acrylate-based resin having a weight-average molecular weight of 20,000 g/mol or more and 50,000 g/mol or less, the first resin has a glass transition temperature of −50° C. to −30° C. and is a polymer of a first composition containing a first alkyl group-containing (meth)acrylate-based monomer and a heterocycloalkyl group-containing (meth)acrylate-based monomer, the intermediate adhesive layer is a cured product of an intermediate adhesive composition containing a second resin, and the second resin has a glass transition temperature of −40° C. to −20° C. and is a polymer of a second composition containing a second alkyl group-containing (meth)acrylate-based monomer and a cycloalkyl group-containing (meth)acrylate-based monomer.

DETAILED DESCRIPTION

Throughout the present specification, it is to be understood that, when any part is referred to as "including" any component, it does not exclude other components, but may further include other components, unless otherwise specified.

In the present specification, the term "(meth)acrylate" refers to acrylate or methacrylate.

In the present specification, the unit "parts by weight" may refer to the ratio of weight between components.

In the present specification, the term "monomer" may refer to a substance capable of forming a covalent bond with the same or different kind of molecule under polymerization reaction conditions. That is, the term "monomer" refers to a substance that may be converted into a polymer with an alternating sequence of repeating units, that is, monomer units, during a polymerization reaction.

Hereinafter, the present specification will be described in more detail.

One embodiment of the present invention provides a multilayer adhesive film including: a first outer adhesive layer; a second outer adhesive layer; and an intermediate adhesive layer disposed between the first outer adhesive layer and the second outer adhesive layer, the multilayer adhesive film having a tensile strength of 40,000 gf/mm² or more and 50,000 gf/mm² or less, wherein the first outer adhesive layer and the second outer adhesive layer are each a cured product of an outer adhesive composition containing a first resin and an acrylate-based resin having a weight-average molecular weight of 20,000 g/mol or more and 50,000 g/mol or less, the first resin has a glass transition temperature of −50° C. to −30° C. and is a polymer of a first composition containing a first alkyl group-containing (meth)acrylate-based monomer and a heterocycloalkyl group-containing (meth)acrylate-based monomer, the intermediate adhesive layer is a cured product of an intermediate adhesive composition containing a second resin, and the second resin has a glass transition temperature of −40° C. to −20° C. and is a polymer of a second composition containing a second alkyl group-containing (meth)acrylate-based monomer and a cycloalkyl group-containing (meth)acrylate-based monomer.

The adhesive film according to one embodiment of the present invention has a multilayer structure including a first outer adhesive layer, a second outer adhesive layer, and an intermediate adhesive layer disposed between the first outer adhesive layer and the second outer adhesive layer and different from the first outer adhesive layer and the second outer adhesive layer, and thus may exhibit both high step absorbency and excellent reworkability, unlike an adhesive film having a single adhesive layer.

According to one embodiment of the present invention, the first outer adhesive layer and the second outer adhesive layer are each a cured product of an outer adhesive composition containing a first resin and an acrylate-based resin having a weight-average molecular weight of 20,000 g/mol or more and 50,000 g/mol or less.

According to one embodiment of the present invention, the glass transition temperature of the first resin contained in the outer adhesive composition is −50° C. to −30° C. For example, the glass transition temperature of the first resin may be −50° C. to −35° C., −50° C. to −40° C., −50° C. to −45° C., −47° C. to −45° C., −46° C. to −45° C., or −47° C. to −46° C.

When the glass transition temperature of the first resin is within the above-described range, the multilayer adhesive film may exhibit excellent step absorbency and more improved reworkability.

According to one embodiment of the present invention, the first composition contains a first alkyl group-containing (meth)acrylate-based monomer and a heterocycloalkyl group-containing (meth)acrylate-based monomer.

According to one embodiment of the present invention, the first alkyl group-containing (meth)acrylate-based monomer may be one or more selected from methyl (meth) acrylate monomers, ethyl (meth)acrylate monomers, n-propyl (meth)acrylate monomers, isopropyl (meth)acrylate monomers, n-butyl (meth)acrylate monomers, sec-butyl (meth)acrylate monomers, pentyl (meth)acrylate monomers, 2-ethylhexyl (meth)acrylate monomers, 2-ethylbutyl (meth) acrylate monomers, n-octyl (meth)acrylate monomers, isooctyl (meth)acrylate monomers, isononyl (meth)acrylate monomers, lauryl (meth)acrylate monomers, and tetradecyl (meth)acrylate monomers.

According to one embodiment of the present invention, the content of the first alkyl group-containing (meth)acrylate-based monomer may be 50 parts by weight to parts by weight based on 100 parts by weight of the first composition. Specifically, the content of the first alkyl group-containing (meth)acrylate-based monomer may be parts by weight to 80 parts by weight, 60 parts by weight to 80 parts by weight, 65 parts by weight to 80 parts by weight, 70 parts by weight to 80 parts by weight, 75 parts by weight to 80 parts by weight, 74 parts by weight to 77 parts by weight, 74 parts by weight to 76 parts by weight, 74 parts by weight to 75 parts by weight, 75 parts by weight to 77 parts by weight, or 75 parts by weight to 76 parts by weight. When the content of the first alkyl group-containing (meth)acrylate-based monomer is within the above-described range, the first outer adhesive layer may exhibit fluidity, thus increasing the step absorbency of the multilayer adhesive film. In addition, when the content of the first alkyl group-containing (meth)acrylate-based monomer is within the above-described range, the first outer adhesive layer may exhibit a suitable adhesive strength, thus improving the adhesive performance of the multilayer adhesive film.

According to one embodiment of the present invention, the heterocycloalkyl group-containing (meth)acrylate-based monomer may contain a ring structure containing a heteroatom other than carbon without having an unsaturated bond in the heterocycloalkyl group, and may include a monocyclic ring or polycyclic ring having 2 to 20 carbon atoms.

According to one embodiment of the present invention, the heterocycloalkyl group-containing (meth)acrylate-based monomer may be one or more selected from tetrahydrofurfuryl (meth)acrylate monomers, tetrahydropyranyl (meth) acrylate monomers, acryloyl morpholine monomers, and cyclic trimethylolpropane formal acrylate monomers.

Meanwhile, since the heterocycloalkyl group-containing (meth)acrylate-based monomer may bond with water due to the presence of a polar moiety in the molecule, an adhesive layer including the same may have excellent durability under high-temperature and high-humidity conditions and may not be whitened under these conditions.

According to one embodiment of the present invention, the content of the heterocycloalkyl group-containing (meth) acrylate-based monomer may be 5 parts by weight to 10 parts by weight based on 100 parts by weight of the first composition. When the content of the heterocycloalkyl group-containing (meth)acrylate-based monomer is within the above-described range, the first resin may have a glass transition temperature within a predetermined range, so that the reduction in reworkability of the multilayer adhesive film may be minimized.

According to one embodiment of the present invention, the acrylate-based resin included in the outer adhesive composition has a weight-average molecular weight of 20,000 g/mol to 50,000 g/mol. Specifically, the weight-average molecular weight of the acrylate-based resin may be 30,000 g/mol to 50,000 g/mol, or 30,000 g/mol to 40,000 g/mol. When the weight-average molecular weight of the acrylate-based resin is within the above-described range, the acrylate-based resin will be difficult to entangle at a temperature higher than the glass transition temperature of the acrylate-based resin, and thus the first outer adhesive layer and the second outer adhesive layer may exhibit suitable fluidity. In addition, the step absorbency of the multilayer adhesive film may be increased. The acrylate-based resin may function as a plasticizer, and may be a polymer of compounds that improve flexibility and elasticity.

According to one embodiment of the present invention, the acrylate-based resin may be one or more polymers selected from the group consisting of ethylhexyl (meth) acrylate monomers, isobornyl (meth)acrylate monomers, hydroxyethyl (meth)acrylate monomers, and benzophenone (meth)acrylate monomers. Specifically, the acrylate-based resin may be a polymer of an ethylhexyl (meth)acrylate monomer, an isobornyl (meth)acrylate monomer and a hydroxyethyl (meth)acrylate monomer, wherein the isobornyl (meth)acrylate monomer may be contained in an amount of 70 to 90 parts by weight based on 100 parts by weight of the total weight of the monomers. The acrylate-based resin may have a glass transition temperature of 40° C. to 60° C. Specifically, the glass transition temperature of the acrylate-based resin may be 45° C. to 55° C., or 47° C. to 53° C. When the glass transition temperature of the acrylate-based resin is within the above-described range, the acrylate-based resin may have low fluidity at room temperature, and as a result, may improve the reworkability of the first outer adhesive layer and the second outer adhesive layer. In addition, the acrylate-based resin may improve the step absorbency.

According to one embodiment of the present invention, the outer adhesive composition may contain the acrylate-based resin in an amount of 5 parts by weight to 15 parts by weight based on 100 parts by weight of the first resin. Specifically, the content of the acrylate-based resin may be 7 parts by weight to 13 parts by weight, more specifically 9 parts by weight to 11 parts by weight. When the content of the acrylate-based resin is within the above-described range, the first outer adhesive layer and the second outer adhesive layer may exhibit suitable fluidity, so that the step absorbency of the multilayer adhesive film may be increased.

According to one embodiment of the present invention, the first outer adhesive layer and the second outer adhesive layer may be a cured product of the same or different outer adhesive compositions.

According to one embodiment of the present invention, the intermediate adhesive layer is a cured product of an intermediate adhesive composition containing a second resin. According to one embodiment of the present invention, the second resin is a polymer of a second composition.

According to one embodiment of the present invention, the glass transition temperature of the second resin is −40° C. to −20° C. Specifically, the glass transition temperature of the second resin may be −35° C. to −20° C., 30° C. to −20° C., −25° C. to −20° C., −24° C. to −20° C., or −23° C. to −20° C., more specifically −22° C. to −20° C. When the glass transition temperature of the second resin is within the above-described range, the reworkability of the multilayer adhesive film may be improved, and the step absorbency thereof may be further improved.

The second composition contains a second alkyl group-containing (meth)acrylate-based monomer and a cycloalkyl group-containing (meth)acrylate-based monomer.

According to one embodiment of the present invention, the second alkyl group-containing (meth)acrylate-based monomer may be one or more selected from methyl (meth)acrylate monomers, ethyl (meth)acrylate monomers, n-propyl (meth)acrylate monomers, isopropyl (meth)acrylate monomers, n-butyl (meth)acrylate monomers, sec-butyl (meth)acrylate monomers, pentyl (meth)acrylate monomers, 2-ethylhexyl (meth)acrylate monomers, 2-ethylbutyl (meth)acrylate monomers, n-octyl (meth)acrylate monomers, isooctyl (meth)acrylate monomers, isononyl (meth)acrylate monomers, lauryl (meth)acrylate monomers, and tetradecyl (meth)acrylate monomers.

The first alkyl group-containing (meth)acrylate-based monomer contained in the first resin and the second alkyl group-containing (meth)acrylate-based monomer contained in the second resin may be the same or different monomers.

According to one embodiment of the present invention, the content of the second alkyl group-containing (meth)acrylate-based monomer may be 30 parts by weight to 60 parts by weight based on 100 parts by weight of the second composition. Specifically, the content of the second alkyl group-containing (meth)acrylate-based monomer may be 35 parts by weight to 60 parts by weight, 40 parts by weight to 60 parts by weight, 45 parts by weight to 60 parts by weight, 50 parts by weight to 60 parts by weight, parts by weight to 55 parts by weight, 40 parts by weight to 55 parts by weight, 45 parts by weight to 55 parts by weight, or 50 parts by weight to 55 parts by weight. When the content of the second alkyl group-containing (meth)acrylate-based monomer is within the above-described range, the reduction in reworkability of the intermediate adhesive layer may be minimized.

According to one embodiment of the present invention, the cycloalkyl group-containing (meth)acrylate-based monomer may be one or more selected from isobornyl (meth)acrylate monomers and cyclohexyl (meth)acrylate monomers. The cycloalkyl group-containing (meth)acrylate-based monomer is preferably a methacrylate-based monomer having a high glass transition temperature and a low reactivity.

According to one embodiment of the present invention, the content of the cycloalkyl group-containing (meth)acrylate-based monomer may be 10 parts by weight to 30 parts by weight based on 100 parts by weight of the second composition. Specifically, the content of the cycloalkyl group-containing (meth)acrylate-based monomer may be 13 parts by weight to 30 parts by weight, 16 parts by weight to 30 parts by weight, 16 parts by weight to 25 parts by weight, 16 parts by weight to 20 parts by weight, or 18 parts by weight to 20 parts by weight. When the content of the cycloalkyl group-containing (meth)acrylate-based monomer is within the above-described range, the second resin may have a glass transition temperature within a predetermined range, so that the reworkability of the multilayer adhesive film may be improved and the reduction in step absorbency thereof may be minimized. Specifically, when the content of the cycloalkyl group-containing (meth)acrylate-based monomer is within the above-described range, the tensile strength of the multilayer adhesive film may be maintained at a suitable level, and thus the adhesive film may be easily removed when reworking is required.

According to one embodiment of the present invention, when the glass transition temperature of the first resin contained in the outer adhesive composition is lower than the glass transition temperature of the second resin contained in the intermediate adhesive composition, the first outer adhesive layer and the second outer adhesive layer may exhibit fluidity, so that the step absorbency may be improved. That is, the outer adhesive layers may effectively fill a stepped portion.

Furthermore, when the glass transition temperature of the second resin contained in the intermediate adhesive composition is higher than the glass transition temperature of the first resin contained in the outer adhesive composition, the intermediate adhesive layer may have improved cohesiveness, and as a result, the tensile strength of the multilayer adhesive film may be improved. That is, by virtue of the intermediate adhesive layer having a relatively high glass transition temperature, the multilayer adhesive film will not easily break when removing it for reworking after attaching it an adherend, and thus the multilayer adhesive film may exhibit excellent reworkability.

According to one embodiment of the present invention, the difference in glass transition temperature between the first resin and the second resin may be 20° C. to 27° C. Specifically, the difference in glass transition temperature may be 23° C. to 26° C., more specifically 23° C. to 24° C., or 25° C. to 26° C. In this case, the multilayer adhesive film may have particularly excellent step absorbency and reworkability.

The tensile strength of the multilayer adhesive film according to one embodiment of the present invention is 40,000 $gf/mm^2$ to 50,000 $gf/mm^2$. For example, the tensile strength may be 41,000 $gf/mm^2$ to 47,000 $gf/mm^2$, 41,000 $gf/mm^2$ to 44,000 $gf/mm^2$, 41,000 $gf/mm^2$ to 43,000 $gf/mm^2$, 43,000 $gf/mm^2$ to 47,000 $gf/mm^2$, or 44,000 $gf/mm^2$ to 47,000 $gf/mm^2$. When the tensile strength of the multilayer adhesive film is within the above-described range, the multilayer adhesive film may exhibit both high step absorbency and excellent reworkability.

According to one embodiment of the present invention, the first composition may further contain, in addition to the first alkyl group-containing (meth)acrylate-based monomer and the heterocycloalkyl group-containing (meth)acrylate-based monomer, one or more selected from a first polar functional group-containing (meth)acrylate-based monomer and a first acrylamide-based monomer. In addition, the first composition may further contain one or more selected from isobornyl (meth)acrylate monomers, cyclohexyl (meth)acrylate monomers and dicyclopentadiene (meth)acrylate monomers.

According to one embodiment of the present invention, the second composition may further contain, in addition to the second alkyl group-containing (meth)acrylate-based monomer and the cycloalkyl group-containing (meth)acrylate-based monomer, one or more selected from a second polar functional group-containing (meth)acrylate-based monomer and a second acrylamide-based monomer.

The first polar functional group-containing (meth)acrylate-based monomer and the second polar functional group-containing (meth)acrylate-based monomer may be each independently one or more selected from 2-hydroxyethyl (meth)acrylate monomers, 4-hydroxybutyl (meth)acrylate monomers, 6-hydroxyhexyl (meth)acrylate monomers, 8-hydroxyoctyl (meth)acrylate monomers, 2-hydroxyethyleneglycol (meth)acrylate monomers, and 2-hydroxypropyleneglycol (meth)acrylate monomers. The first polar functional group-containing (meth)acrylate-based monomer and the second polar functional group-containing (meth)acrylate-based monomer, which are hydroxyl group-containing compounds, may bond with water, and thus the adhesive layers including the same may have excellent durability under high-temperature and high-humidity conditions and may not be whitened under these conditions.

Meanwhile, the first acrylamide-based monomer and the second acrylamide-based monomer may be each independently one or more selected from N,N-dimethylacrylamide monomers, N,N-dimethylmethacrylamide monomers, N-ethylmethacrylamide monomers, N-ethylacrylamide monomers, N,N-diethylacrylamide monomers, and N-propylacrylamide monomers.

According to one embodiment of the present invention, the first polar functional group-containing (meth)acrylate-based monomer may be contained in an amount of 10 parts by weight to 15 parts by weight based on 100 parts by weight of the first composition. When the content of the first polar functional group-containing (meth)acrylate-based monomer is within the above-described range, there is an advantage in that the multilayer adhesive film may exhibit both reworkability and step absorbency at suitable levels. Meanwhile, the first acrylamide-based monomer may be contained in an amount of 3 parts by weight to 6 parts by weight based on 100 parts by weight of the first composition. Specifically, the first acrylamide-based monomer may be contained in an amount of 4 parts by weight to 6 parts by weight, more specifically, 5 parts by weight to 6 parts by weight.

According to one embodiment of the present invention, the second polar functional group-containing (meth)acrylate-based monomer may be contained in an amount of 15 parts by weight to 20 parts by weight based on 100 parts by weight of the second composition. When the second polar functional group-containing (meth)acrylate-based monomer is within the above-described range, there is an advantage in that the multilayer adhesive film may exhibit both reworkability and step absorbency at suitable levels. Meanwhile, the second acrylamide-based monomer may be contained in an amount of 6 parts by weight to 15 parts by weight based on 100 parts by weight of the second composition. Specifically, the second acrylamide-based monomer may be contained in an amount of 8 parts by weight to 13 parts by weight, more specifically, 9 parts by weight to 11 parts by weight.

According to one embodiment of the present invention, the outer adhesive composition and the intermediate adhesive composition may further contain, as additives, a tackifier, a curing agent, an initiator, a coupling agent, and the like, which are generally used in the art, but the additives are not limited thereto.

According to one embodiment of the present invention, the thickness ratio between the first outer adhesive layer and the intermediate adhesive layer, and the thickness ratio between the second outer adhesive layer and the intermediate adhesive layer may each be 1:3 to 4:7. The thickness ratio between the first outer adhesive layer and the intermediate adhesive layer, and the thickness ratio between the second outer adhesive layer and the intermediate adhesive layer may be the same or different. When the thickness ratio between the first outer adhesive layer and the intermediate adhesive layer, and the thickness ratio between the second outer adhesive layer and the intermediate adhesive layer are within the above-described range, the multilayer adhesive film may have a suitable tensile strength, and thus exhibit high step absorbency while having excellent reworkability.

According to one embodiment of the present invention, the thickness of each of the first outer adhesive layer and the second outer adhesive layer may be 15 μm to 50 μm, and the thickness of the intermediate adhesive layer may be 30 μm to 150 μm. Specifically, the thickness of each of the first outer adhesive layer and the second outer adhesive layer may be 30 μm to 40 μm, and the thickness of the intermediate adhesive layer may be 70 μm to 90 μm. When the thickness of each of the first outer adhesive layer and the second outer adhesive layer and the thickness of the intermediate adhesive layer are within the above-described ranges, the multilayer adhesive film may exhibit both high step absorbency and excellent reworkability.

According to one embodiment of the present invention, the thickness of the first outer adhesive layer and the thickness of the second outer adhesive layer may be the same or different.

According to one embodiment of the present invention, the multilayer adhesive film may be produced by sequentially applying and depositing the outer adhesive composition, the intermediate adhesive composition and the outer adhesive composition onto a substrate, and then simultaneously curing the applied compositions. Specifically, the multilayer adhesive film is not produced by separately preparing each of the layers, and then bonding the prepared layers together, but may be produced by a method of sequentially depositing the adhesive compositions onto a substrate, and then simultaneously curing the deposited compositions. Thus, a section in which the adhesive compositions are mixed together may occur among the adhesive layers. This section in which the adhesive compositions are mixed together may ensure better interlayer adhesion than a conventional multilayer adhesive film and prevent interfacial separation between the layers even in an extreme environment. The substrate may be a silicone-treated PET release film, but is not limited thereto.

A method of simultaneously curing the adhesive compositions may be heat-curing or photo-curing, specifically, photo-curing using black light (UV-A light). The intensity of light used for the photo-curing may be 0.5 mW/cm$^2$ to 1.0 mW/cm$^2$, and the photo-curing time may be 3 to 5 minutes.

However, the method for producing the multilayer adhesive film is not limited to the above-described method, and a method that is generally applied in the art may be used to produce the multilayer adhesive film.

The multilayer adhesive film may be used for attachment of various optical parts, such as a polarizing plate, a phase retardation plate, an optical compensation film, a reflection sheet, a protective film and a brightness enhancement film. However, the present invention is not limited thereto, and the multilayer adhesive film may be used without limitation in applications known in the art.

Hereinafter, the present invention will be described in detail with reference to examples. However, the examples according to the present invention may be modified into various different forms, and the scope of the present invention is not interpreted as being limited to the examples described below. The examples of the present specification are provided to more completely explain the present invention to those skilled in the art.

Preparation of Outer Adhesive Composition

A first resin was produced by photopolymerization of a first composition containing a 2-ethylhexyl acrylate (2-EHA) monomer, a tetrahydrofurfuryl methacrylate (THFMA) monomer, a hydroxyethyl acrylate (HEA) monomer and a dimethylacrylamide (DMAA) monomer in amounts shown in Table 1 below.

An acrylate-based resin having a weight-average molecular weight of 20,000 g/mol to 50,000 g/mol was produced by photopolymerization of a 2-ethylhexyl acrylate (2-EHA) monomer, an isobornyl acrylate (IBOA) monomer and a hydroxyethyl acrylate (HEA) monomer. At this time, the IBOA was used in an amount of 70 parts by weight based on 100 parts by weight of the total weight of the monomers.

The acrylate-based resin and additives were added to the first resin in the amounts shown in Table 1 below, based on 100 parts by weight of the first resin, thereby preparing outer adhesive compositions (A to F).

TABLE 1

| | First composition | | | | | Acrylate-based resin (parts by weight) | Additives | | |
|---|---|---|---|---|---|---|---|---|---|
| | 2-EHA (parts by weight) | THFMA (parts by weight) | HEA (parts by weight) | DMAA (parts by weight) | Glass transition temperature (° C.) of first resin | | Photoinitiator (parts by weight) | Curing agent (parts by weight) | |
| A | 75 | 10 | 10 | 5 | −45 | 10 | 0.5 | 0.11 | 0.2 |
| B | 75 | 5 | 15 | 5 | −46 | 10 | 0.5 | 0.11 | 0.2 |
| C | 75 | 10 | 10 | 5 | −45 | — | 0.5 | 0.11 | 0.2 |
| D | 78 | 10 | 5 | 7 | −44.2 | — | 0.5 | 0.11 | 0.2 |
| E | 73 | 10 | 10 | 7 | −41.5 | — | 0.5 | 0.11 | 0.2 |
| F | 80 | 10 | 5 | 5 | −47.1 | — | 0.5 | 0.11 | 0.2 |

Preparation of Intermediate Adhesive Composition

A second resin was produced by photopolymerization of a second composition containing a 2-ethylhexyl acrylate (2-EHA) monomer, an isobornyl methacrylate (IBOMA) monomer, a hydroxyethyl acrylate (HEA) monomer and a dimethylacrylamide (DMAA) monomer in the amounts shown in Table 2 below. Additives were added to the second resin in the amounts shown in Table 2 below, based on 100 parts by weight of the second resin, thereby preparing intermediate adhesive compositions (G to J).

TABLE 2

| | Second composition | | | | | Additives | | |
|---|---|---|---|---|---|---|---|---|
| | 2-EHA (parts by weight) | IBOMA (parts by weight) | HEA (parts by weight) | DMAA (parts by weight) | Glass transition temperature (° C.) of second resin | Photoinitiator (parts by weight) | Curing agent (parts by weight) | Coupling agent (parts by weight) |
| G | 55 | 20 | 15 | 10 | −22 | 0.2 | 1.1 | 0.2 |
| H | 50 | 20 | 20 | 10 | −20 | 0.2 | 0.2 | 0.2 |
| I | 52 | 11 | 15 | 10 | −16.2 | 0.2 | 0.2 | 0.2 |
| J | 56 | 15 | 10 | 5 | −19.7 | 0.2 | 0.2 | 0.2 |

Examples 1 to 6

As shown in Table 3 below, multilayer adhesive films of Examples 1 to 6 were produced using one of the outer adhesive compositions (A and B) and one of the intermediate adhesive compositions (G to H).

Specifically, the outer adhesive composition, the intermediate adhesive composition and the outer adhesive composition were sequentially applied to a silicone-treated PET release film using a triple slot die (Pactive Korea Co., Pactive Engineering), and then the applied compositions were covered with another silicone-treated release film. Then, the applied compositions were simultaneously cured with black light (light intensity: 0.7 mW/cm$^2$) for 3 to 5 minutes, thereby producing multilayer adhesive films in which the first outer adhesive layer, the intermediate adhesive layer and the second outer adhesive layer are sequentially deposited to the thicknesses shown in Table 3 below.

TABLE 3

| | Outer adhesive composition | Intermediate adhesive composition | Thickness (μm) of first outer adhesive composition | Thickness (μm) of intermediate adhesive layer | Thickness (μm) of second outer adhesive layer |
|---|---|---|---|---|---|
| Example 1 | A | G | 30 | 90 | 30 |
| Example 2 | A | H | 40 | 70 | 40 |
| Example 3 | A | H | 30 | 90 | 30 |
| Example 4 | B | G | 40 | 70 | 40 |
| Example 5 | B | G | 30 | 90 | 30 |
| Example 6 | B | H | 30 | 90 | 30 |

Comparative Examples 1 to 8

As shown in Table 4 below, multilayer adhesive films of Comparative Examples 1 to 8 were produced using one of the outer adhesive compositions (C to E) and one of the intermediate adhesive compositions (I to J).

Specifically, the outer adhesive composition, the intermediate adhesive composition and the outer adhesive composition were sequentially applied to a silicone-treated PET release film using a triple slot die (Pactive Korea Co., Pactive Engineering), and then the applied compositions were covered with another silicone-treated release film. Then, the applied compositions were simultaneously cured with black light (light intensity: 0.7 mW/cm$^2$) for 3 to 5 minutes, thereby producing multilayer adhesive films in which the first outer adhesive layer, the intermediate adhesive layer and the second outer adhesive layer are sequentially deposited to the thicknesses shown in Table 4 below.

TABLE 4

| | Outer adhesive composition | Intermediate adhesive composition | Thickness (μm) of first outer adhesive composition | Thickness (μm) of intermediate adhesive layer | Thickness (μm) of second outer adhesive layer |
|---|---|---|---|---|---|
| Comparative Example 1 | C | I | 30 | 90 | 30 |
| Comparative Example 2 | C | J | 30 | 90 | 30 |
| Comparative Example 3 | D | I | 30 | 90 | 30 |
| Comparative Example 4 | D | J | 30 | 90 | 30 |
| Comparative Example 5 | E | I | 30 | 90 | 30 |
| Comparative Example 6 | E | J | 30 | 90 | 30 |
| Comparative Example 7 | F | I | 30 | 90 | 30 |
| Comparative Example 8 | F | J | 30 | 90 | 30 |

The physical properties of the multilayer adhesive films according to Examples 1 to 6 and Comparative Examples to 8 were measured and evaluated, and the results are shown in Table 5 below.

Measurement of Tensile Strength

Each of the produced multilayer adhesive films was laminated in four layers, and then cut to a size of 1 cm (width)×4 cm (length). In order to prevent the multilayer adhesive film from adhering to the clamp of a texture analyzer (TA), 1 cm portions from both longitudinal ends of each multilayer adhesive film was wrapped with a general tape, and both ends of each multilayer adhesive film were fixed to the clamp of a Texture Analyzer (TA). Using the texture analyzer (TA), the tensile strength of each multilayer adhesive film was measured while raising the clamp at a constant speed.

Evaluation of Reworkability

Each of the produced multilayer adhesive films was attached to a glass substrate and kept in an oven for 60° C. for 1 hour, and then the reworkability of each multilayer adhesive film was evaluated according to the following ratings while removing the adhesive film: O: the multilayer adhesive film is removed all at once without breaking; Δ: the multilayer adhesive film breaks easily and multiple removal operations are required; and X: the multilayer adhesive film breaks easily and the removal operation is impossible.

Evaluation of Step Absorbency

The adhesive film was laminated onto a 1.1 T glass having a 20 μm ink step, and then a 0.55 T glass substrate was laminated thereon. Next, the laminate was kept in an autoclave at 40° C. and 4 bar for 20 minutes, and then post-cured with a dose of 3 J using a metal halide lamp. The number of bubbles generated after the post-curing was measured, and the step absorbency of each adhesive film was evaluated according to the following ratings: O: the number of bubbles is 2 or less; and X: the number of bubbles is 3 or more.

Evaluation of Durability and Whitening

Each of the adhesive films was laminated onto a 1.1 T glass having a 20 μm ink step, and then a 0.55 T glass substrate was laminated thereon. Next, the laminate was kept in an autoclave at 40° C. and 4 bar for 20 minutes, and then post-cured with a dose of 3 J using a metal halide lamp. Next, the adhesive film was kept in an oven at 85° C. and 85% RH for 24 hours.

After keeping in the oven at 85° C. and 85% RH for 24 hours, the durability of the adhesive film was evaluated according to the following ratings: O: an additional bubble other than the bubble generated after post-curing is not generated; Δ: the size of the bubble generated after post-curing changes; and X: an additional bubble other than the bubble generated after post-curing is generated.

After keeping in the oven at 85° C. and 85% RH for 24 hours, the whitening of the adhesive film was evaluated according to the following ratings: O: whitening due to water does not appear; and X: whitening due to water appears.

TABLE 5

| | Tensile strength (gf/mm$^2$) | Reworkability | Step absorbency | Durability | Whitening |
|---|---|---|---|---|---|
| Example 1 | 43406 | O | O | O | O |
| Example 2 | 46351 | O | O | O | O |
| Example 3 | 49291 | O | O | O | O |
| Example 4 | 42520 | O | O | O | O |
| Example 5 | 42570 | O | O | O | O |
| Example 6 | 41206 | O | O | O | O |
| Comparative Example 1 | 33318 | X | O | O | O |
| Comparative Example 2 | 37097 | Δ | O | O | O |

TABLE 5-continued

| | Tensile strength (gf/mm²) | Reworkability | Step absorbency | Durability | Whitening |
|---|---|---|---|---|---|
| Comparative Example 3 | 36961 | Δ | ○ | ○ | ○ |
| Comparative Example 4 | 26840 | X | ○ | ○ | ○ |
| Comparative Example 5 | 33632 | X | ○ | ○ | ○ |
| Comparative Example 6 | 32836 | X | ○ | ○ | ○ |
| Comparative Example 7 | 38377 | Δ | X | ○ | ○ |
| Comparative Example 8 | 29699 | X | ○ | ○ | ○ |

As shown in Table 5 above, it could be confirmed that the multilayer adhesive films of Examples 1 to 6 had not only excellent reworkability but also excellent step absorbency. In addition, it could be confirmed that the multilayer adhesive films of Examples 1 to 6 had excellent durability under high-temperature and high-humidity conditions and were not whitened under these conditions.

On the contrary, it could be confirmed that, in the case of Comparative Examples 1 to 8, in which the outer adhesive composition containing no acrylate-based resin and the intermediate adhesive composition containing the second resin having a glass transition temperature out of −40° C. to −20° C. were used, the reworkability was poor.

Therefore, it can be seen that the multilayer adhesive film according to one embodiment of the present invention has excellent reworkability while having high step absorbency, and also has excellent durability under high-temperature and high-humidity conditions and is not whitened under these conditions.

As described above, the multilayer adhesive film according to one embodiment of the present invention may exhibit both high step absorbency and excellent reworkability.

What is claimed is:

1. A multilayer adhesive film, comprising:
a first outer adhesive layer;
a second outer adhesive layer; and
an intermediate adhesive layer disposed between the first outer adhesive layer and the second outer adhesive layer,
wherein the multilayer adhesive film has a tensile strength of 40,000 gf/mm² or more to 50,000 gf/mm² or less,
wherein the first outer adhesive layer and the second outer adhesive layer are each a cured product of an outer adhesive composition comprising a first resin and an acrylate-based resin having a weight-average molecular weight of 20,000 g/mol or more to 50,000 g/mol or less,
wherein the first resin has a glass transition temperature of −50° C. to −30° C. and is a polymer of a first composition comprising a first alkyl group-containing (meth)acrylate-based monomer and a heterocycloalkyl group-containing (meth)acrylate-based monomer,
wherein the intermediate adhesive layer is a cured product of an intermediate adhesive composition comprising a second resin, and
wherein the second resin has a glass transition temperature of −40° C. to −20° C. and is a polymer of a second composition comprising a second alkyl group-containing (meth)acrylate-based monomer and a cycloalkyl group-containing (meth)acrylate-based monomer.

2. The multilayer adhesive film of claim 1, wherein the first alkyl group-containing (meth)acrylate-based monomer is one or more selected from methyl (meth)acrylate monomers, ethyl (meth)acrylate monomers, n-propyl (meth)acrylate monomers, isopropyl (meth)acrylate monomers, n-butyl (meth)acrylate monomers, sec-butyl (meth)acrylate monomers, pentyl (meth)acrylate monomers, 2-ethylhexyl (meth)acrylate monomers, 2-ethylbutyl (meth)acrylate monomers, n-octyl (meth)acrylate monomers, isooctyl (meth)acrylate monomers, isononyl (meth)acrylate monomers, lauryl (meth)acrylate monomers, or tetradecyl (meth)acrylate monomers.

3. The multilayer adhesive film of claim 1, wherein the first alkyl group-containing (meth)acrylate-based monomer is included in an amount of 50 parts or more by weight to 80 parts or less by weight based on 100 parts by weight of the first composition.

4. The multilayer adhesive film of claim 1, wherein the heterocycloalkyl group-containing (meth)acrylate-based monomer is one or more selected from tetrahydrofurfuryl (meth)acrylate monomers, tetrahydropyranyl (meth)acrylate monomers, acryloyl morpholine monomers, or cyclic trimethylolpropane formal acrylate monomers.

5. The multilayer adhesive film of claim 1, wherein the heterocycloalkyl group-containing (meth)acrylate-based monomer is included in an amount of 5 parts or more by weight to 10 parts or less by weight based on 100 parts by weight of the first composition.

6. The multilayer adhesive film of claim 1, wherein the acrylate-based resin is one or more polymers selected from ethylhexyl (meth)acrylate monomers, isobornyl (meth)acrylate monomers, hydroxyethyl (meth)acrylate monomers, or benzophenone (meth)acrylate monomers.

7. The multilayer adhesive film of claim 1, wherein the acrylate-based resin is included in an amount of 5 parts or more by weight to 15 parts or less by weight based on 100 parts by weight of the first resin.

8. The multilayer adhesive film of claim 1, wherein the second alkyl group-containing (meth)acrylate-based monomer is one or more selected from methyl (meth)acrylate monomers, ethyl (meth)acrylate monomers, n-propyl (meth)acrylate monomers, isopropyl (meth)acrylate monomers, n-butyl (meth)acrylate monomers, sec-butyl (meth)acrylate monomers, pentyl (meth)acrylate monomers, 2-ethylhexyl (meth)acrylate monomers, 2-ethylbutyl (meth)acrylate monomers, n-octyl (meth)acrylate monomers, isooctyl (meth)acrylate monomers, isononyl (meth)acrylate monomers, lauryl (meth) acrylate monomers, or tetradecyl (meth) acrylate monomers.

9. The multilayer adhesive film of claim 1, wherein the second alkyl group-containing (meth)acrylate-based monomer is included in an amount of 30 parts or more by weight to 60 parts or less by weight based on 100 parts by weight of the second composition.

10. The multilayer adhesive film of claim 1, wherein the cycloalkyl group-containing (meth)acrylate-based monomer is one or more selected from isobornyl (meth)acrylate monomers or cyclohexyl (meth)acrylate monomers.

11. The multilayer adhesive film of claim 1, wherein the cycloalkyl group-containing (meth)acrylate-based monomer is included in an amount of 10 parts or more by weight to 30 parts or less by weight based on 100 parts by weight of the second composition.

12. The multilayer adhesive film of claim 1, wherein the first composition further comprises at least one of a first polar functional group-containing (meth)acrylate-based monomer or a first acrylamide-based monomer.

13. The multilayer adhesive film of claim 1, wherein the second composition further comprises at least one of a second polar functional group-containing (meth)acrylate-based monomer or a second acrylamide-based monomer.

14. The multilayer adhesive film of claim 1, wherein a thickness ratio between the first outer adhesive layer and the intermediate adhesive layer, and a thickness ratio between the second outer adhesive layer and the intermediate adhesive layer are each 1:3 to 4:7.

15. The multilayer adhesive film of claim 14, wherein the thickness of the first outer adhesive layer and the thickness of the second outer adhesive layer are each 15 µm or more to 50 µm or less, and the thickness of the intermediate adhesive layer is 30 µm or more to 150 µm or less.

16. The multilayer adhesive film of claim 1, wherein the first outer adhesive layer, the second outer adhesive layer and the intermediate adhesive layer are formed by simultaneous curing of the outer adhesive composition and the intermediate adhesive composition.

* * * * *